DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 9, 1974

921 O.G. 439

T921,008

HEAT TREATMENT OF CERTAIN ELASTOMER/ALPHA-SUBSTITUTED BETA-PROPIOLACTONE GRAFT COPOLYMERS TO IMPROVE PHYSICAL PROPERTIES THEREOF

Richard Charles Thamm, Wilmington, Del., assignor to E. I. du Pont de Nemours and Company, Wilmington, Del.

Filed Jan. 16, 1973, Ser. No. 324,164
**Int. Cl. B29c *25/00***
U.S. Cl. 264—85
No Drawing. 31 Pages Specification

Thermoplastic random graft copolymers, having a backbone chain made of an elastomer and up to 60 weight percent of crystallizable side-chains with an average length of 3 to 1000 alpha-substituted-beta-propiolactone monomer units attached to about 0.02 to 1.0 mole of random anionic grafting sites per kilogram of said backbone elastomer, are heat treated in the absence of nucleating agents and stress to a temperature above 70° C. but below their melt flow temperature to improve their compression set resistance. Preferred graft copolymers have backbone chains made from poly(ethyl acrylate) or ethylene/propylene/non-conjugated diene copolymers (EPDM) modified with maleic anhydride or thioglycolic acid; their side-chains are made from pivalolactone. Carbon black, oil, pigments, antioxidants, etc., can be present. EPDM-maleic anhydride graft copolymers are preferably treated at temperatures above the environmental temperature to which they will be subjected. Treatment time will vary with the particular graft copolymer and is preferably one to eight hours. The treated graft copolymers should not subsequently be heated above their melting point or while they are under tension or compression (causing permanent change of dimension).